(12) United States Patent
Rönning

(10) Patent No.: US 6,386,592 B1
(45) Date of Patent: May 14, 2002

(54) CONNECTOR DEVICE FOR USE IN A FLUID TRANSPORT SYSTEM

(76) Inventor: Lennart Rönning, Järnvägsgatan 11, 262 32, Ängelholm (SE)

( * ) Notice: Subject to any disclaimer, the term of this patent is extended or adjusted under 35 U.S.C. 154(b) by 0 days.

(21) Appl. No.: 09/594,024

(22) Filed: Jun. 15, 2000

(30) Foreign Application Priority Data

Jun. 24, 1999 (EP) ............................................. 99850114

(51) Int. Cl.⁷ ................................................. F16L 35/00
(52) U.S. Cl. ............................................ 285/18; 285/39
(58) Field of Search ........................... 285/18, 39, 273, 285/278, 353, 354, 920; 173/215; 81/57.3, 58.1

(56) References Cited

U.S. PATENT DOCUMENTS

| | | | |
|---|---|---|---|
| 1,504,587 A | * | 8/1924 | Trachsel ................. 252/273 X |
| 2,795,985 A | | 6/1957 | Wilson |
| 2,805,871 A | * | 9/1957 | Hammon ..................... 285/18 |
| 4,492,133 A | | 1/1985 | Schosek |
| 4,618,170 A | * | 10/1986 | Fishburne ............... 285/354 X |
| 4,662,654 A | | 5/1987 | Marshall |
| 5,033,435 A | * | 7/1991 | Ostarello et al. ....... 285/354 X |

FOREIGN PATENT DOCUMENTS

| | | |
|---|---|---|
| DE | A1-19754275 | 6/1998 |
| FR | A962575 | 6/1957 |
| GB | 707988 | 4/1954 |
| GB | A-2246090 | 1/1992 |

* cited by examiner

Primary Examiner—Lynne H. Browne
Assistant Examiner—Greg Binda

(57) ABSTRACT

A connector device (10) for use in a fluid transport system (2). The connector device comprises a body (12), a threaded coupling means (52) rotatably arranged at said body (12), and a fluid transport channel (22, 57) extending from said coupling means (52). Further it comprises a string shaped driving means (14) arranged for rotation of said threaded coupling means (52).

9 Claims, 5 Drawing Sheets

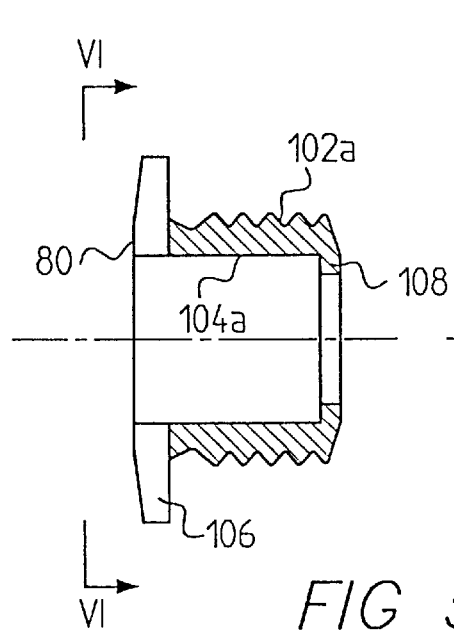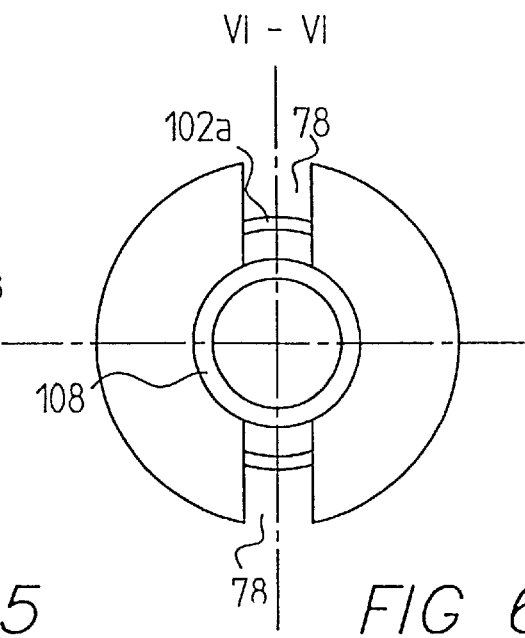
FIG 5    FIG 6
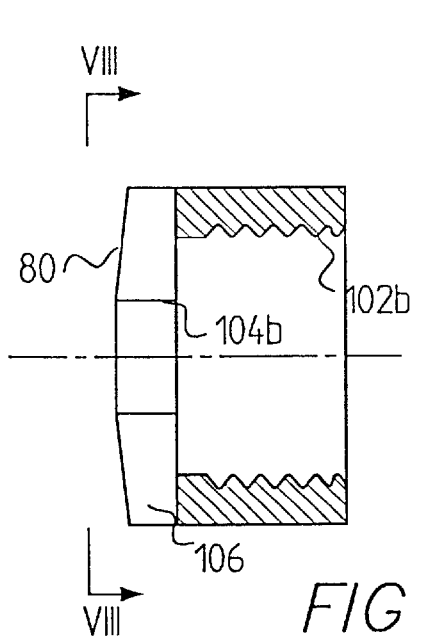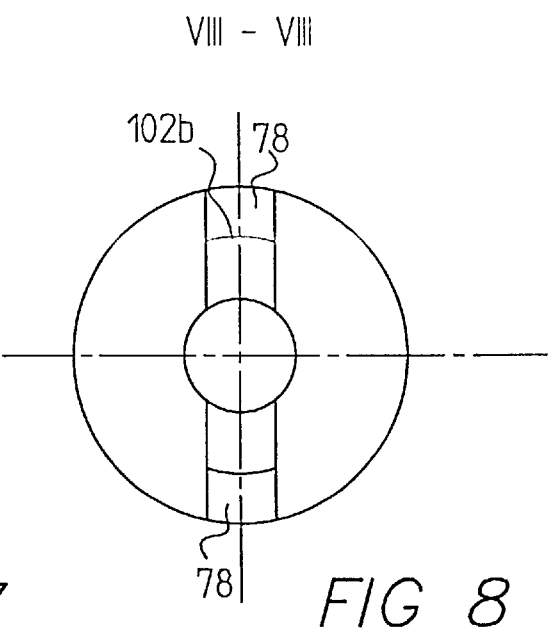
FIG 7    FIG 8

CONNECTOR DEVICE FOR USE IN A FLUID TRANSPORT SYSTEM

TECHNICAL FIELD OF THE INVENTION

The present invention relates to a connector device for use in a fluid transport system. The connector device comprises a body, a threaded coupling means rotatably extended from said body, and a fluid transport channel extending from said coupling means.

BACKGROUND OF THE INVENTION

In systems transporting fluids and where receiving or feeding systems are changed on a regularly basis, the connection between the systems often consists of a male and a female threaded connector, respectively. The two connectors are screwed together into a position where the connection can transport the fluid from one system to another without any fluid leaking out at the connection.

The two connectors are commonly screwed together by hand or by using a wrench and often at least one of the connectors requires to be turned many turns. If the two systems, which are to be connected, are frequently connected to and disconnected from each other, the work doing this is time consuming and could have a harmful effect, ergonomically, to the person performing the job.

To solve these problems several types of more or less "screwless" coupling means have been constructed. These screwless coupling means are commonly provided with a cylindrical threaded means that is divided into segments, which are possible to move in a radial direction of said cylindrical threaded means for decreasing or increasing its radius.

However, coupling means of this type are complicated and are expensive to produce.

U.S. Pat. No. 4,662,654 discloses a cylinder connector where a threaded coupling cylinder is rotated by means of compressed air via a turbine. Further it discloses a cylinder connector where a threaded coupling cylinder is rotated by means of an electrical motor via a bevel gear. These types of connectors save time and spare the people who are operating them. However, these connector types require a system for compressed air or electricity for operation. Further, these connectors have a rather complicated structure, which makes them expensive to produce and difficult to maintain and repair.

SUMMARY OF THE INVENTION

The object of the present invention is to provide a new and improved connector device and a new and improved method for connecting two threaded coupling means.

A specific object is to provide an inexpensive and uncomplicated connector device.

Another object is to reduce the effort needed for joining two threaded coupling means.

Yet another object is to enable faster connecting and disconnecting operations between threaded coupling means.

A further object is to improve the ergonomy for a person connecting and disconnecting threaded coupling means.

These objects, as well as other objects that will become apparent from the description below. Preferred embodiments of the invention are disclosed in the dependent claims.

The connector device for use in a fluid transport system, according to the invention, comprises a body, a threaded coupling means rotatably arranged at said body, and a fluid transport channel extending from said coupling means. According to the invention, the connector device comprises a string shaped driving means, which is arranged for rotation of said threaded coupling means.

Said connector device makes it possible for an operator to effect the rotation of the coupling means by performing linear movements with his arm instead of using a wrench or turning the coupling means by hand. Such linear movement of the arm has a number of advantages in relation to a turning motion with the hand. For example, the linear movement can be performed with a higher speed, is more powerful and is less wearing. Further, the construction can be made rather simple and, therefore, does not involve large manufacturing costs. Another important advantage of the invention is that there is no need for any external power sources, for example, compressed air or electricity.

According to one embodiment of the invention, the string shaped driving means is arranged at two wheels, a first and a second wheel. These wheels are arranged at a distance from each other, and the first wheel is connected to the threaded coupling means. The distance between the wheels is at least of such size that a linear movement of a gripping point on said string shaped driving means, in direction from one wheel to the other results in a rotation of the threaded coupling means as many turns as required for providing a connection to the corresponding coupling means. Thus, it is possible for an operator to screw the threaded coupling means inwards or outwards in a continuous linear movement by gripping and pulling the string shaped driving means at one single gripping point along its extension. One pull of the string shaped driving means is therefore enough for providing a safe, non-leaking connection of two channels. Preferably, the distance between the first and the second wheel is at least twice the circumference of the first wheel. An advantage of this embodiment is that the connection is established fast and that the operator does not have to change the grip during the operation.

By altering the radius of the first wheel, the force transmitted to the threaded coupling means can be altered.

According to another embodiment, there is provided a means for alignment of the threaded coupling means, in respect of a corresponding coupling means. This means is provided to make the threaded coupling means self-adjustable for avoiding jamming of the threads of the two coupling means. Jamming of this type is likely to occur when threads that are to be connected to each other are subject to forces that tend to angle the longitudinal axises of the coupling means in respect of each other, which could occur when the string shaped driving means is pulled.

In a specific embodiment, the alignment means is implemented by the threaded coupling means being moveably mounted on a shaft of the body, to allow angular displacement of said coupling means in relation to the shaft. Thereby jamming of the threads, as result of the connector device not being held in line with the corresponding coupling means, is avoided in a very reliable way.

The above mentioned angling can be accomplished by, for example, providing the alignment means in the form of a radial play between the shaft and the threaded coupling means. The term play shall in connection with the invention be interpreted as a space for motion. The radial play is preferably arranged to allow a limited movement in a direction perpendicular to said longitudinal axis of the shaft. Further, a axial play can be arranged to allow a limited movement in a direction parallel to said longitudinal axis of the shaft. The advantage of using a play for providing means for angling is that it results in a low-cost construction as a result of its simplicity.

The angling can according to another embodiment also be accomplished by arranging the alignment means in the form of a joint allowing angling of a portion of the shaft inclusive the coupling means.

According to a further embodiment of the invention, the threaded coupling means is replaceably mounted on the shaft. Thus, achieving the advantage of easy maintenance and the possibility of changing a coupling means when it is worn out or when a coupling means of another type and/or dimension is required. Further, the shaft is preferably replaceably mounted to a housing. Thereby making it possible to change the characteristics of all of the parts that are to fit into a corresponding coupling means.

BRIEF DESCRIPTION OF THE DRAWINGS

Other features and advantages of the present invention will become apparent from the following detailed description of a preferred embodiment, with reference to the accompanying drawings.

FIG. 5 is a cross-sectional view of the male coupling means of FIG. 3.

FIG. 6 is a view, taken along the line VI—VI, of the male coupling means of FIG. 5.

FIG. 7 is a cross-sectional view of the female coupling means of FIG. 4.

FIG. 8 is a view, taken along the line VIII—VIII, of the female coupling means of FIG. 7.

DETAILED DESCRIPTION OF A PREFERRED EMBODIMENT

Figure 1:
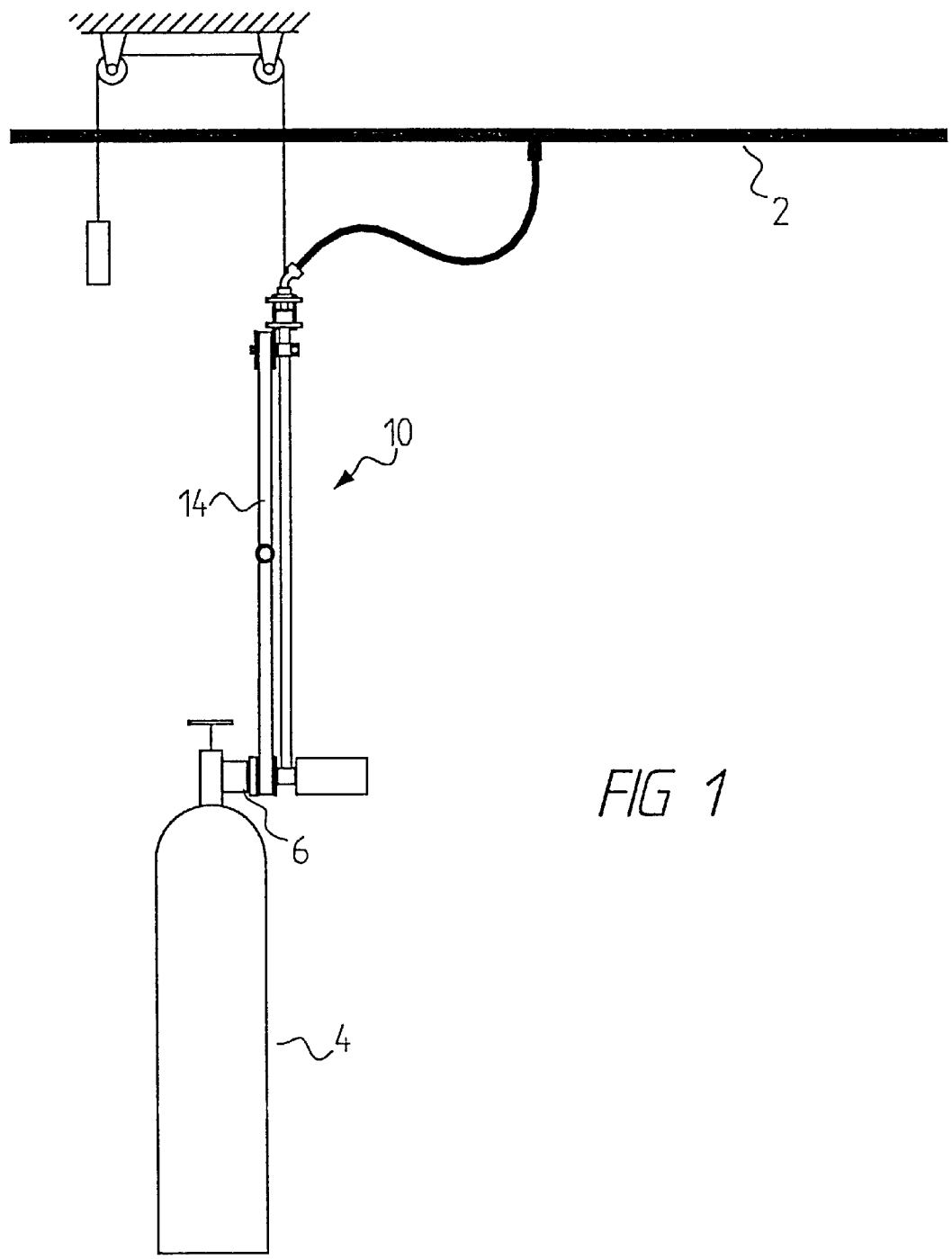
FIG. 1 shows a possible environment for the connector device according to the present invention.

A connector device 10 according to the invention is suitable for connecting a gas-feeding pipe 2 to a gas cylinder 4 for filling the gas cylinder 4 with a gas, see FIG. 1. It should however be emphasised that the connector device could be used in a variety of applications where two systems are to be connected for any kind of fluid communication.

When the connector device 10 is used for filling gas cylinders 4, as shown by example in FIG. 1, such gas cylinders 4 generally are frequently changed while the gas-feeding system 2 is never or seldom changed. Therefore, the connection to the gas cylinder 4 is established by means of the connector device 10 of the invention, while the connector device 10 in itself is more or less stationary connected to the gas-feeding system 2, preferably via a flexible tubing. The connector device 10 can optionally be suspended in any suitable way.

Figure 2:
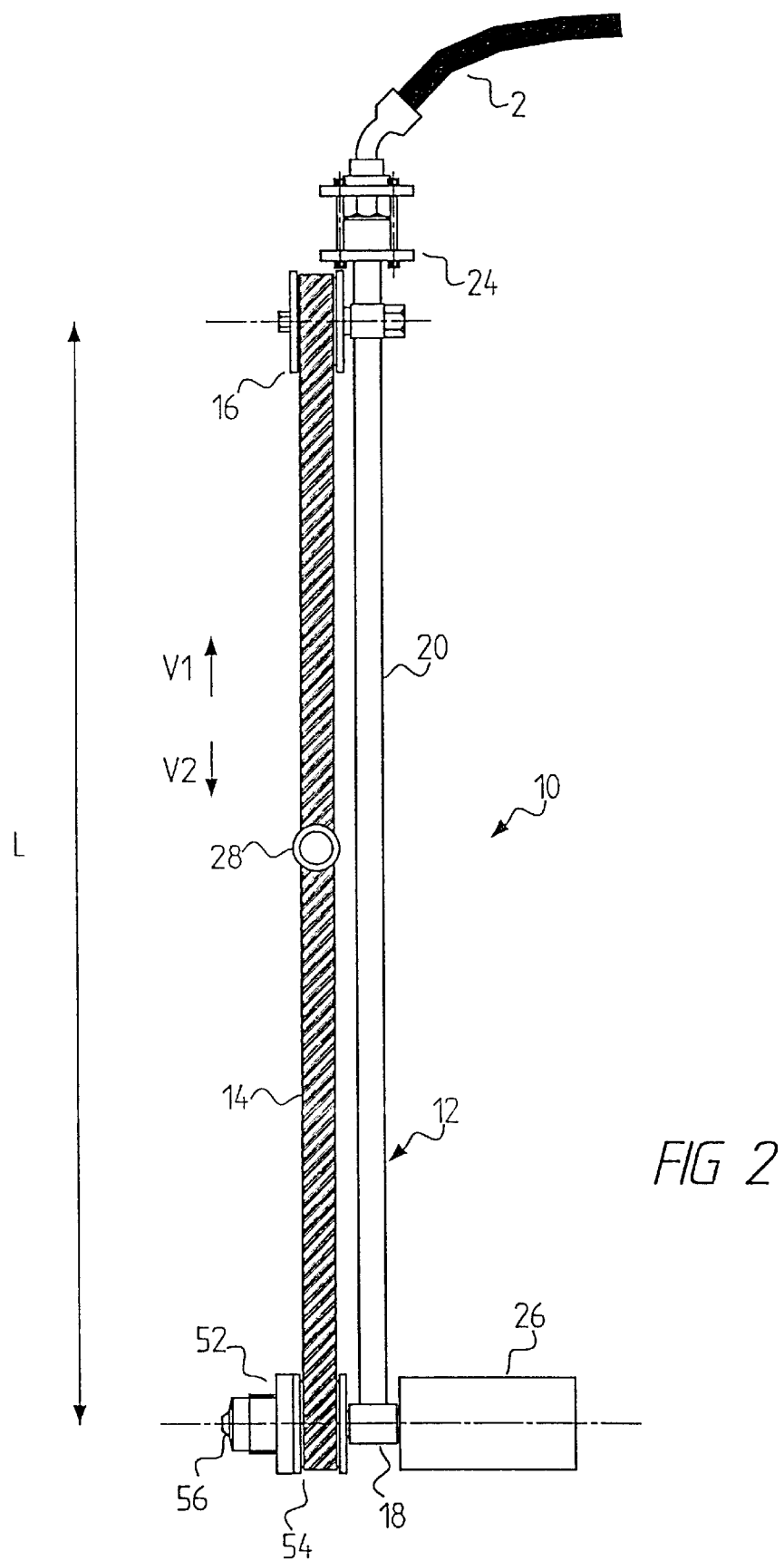
FIG. 2 is a schematic view of the connector device in FIG. 1.

FIG. 2 shows a preferred embodiment of the connector device 10 comprising a body 12, a string shaped driving means 14, a threaded coupling means 52, and an internal fluid transport channel.

The string shaped driving means 14 could be a chain, a rope, a wire, a cord, a bolt, etc. In the preferred embodiment of the invention it is a cogged transmission belt. The string shaped driving means 14 is preferably arranged in an endless loop around two wheels, a first wheel 54 and a second wheel 16, which are positioned at a specific distance L from each other. The two wheels 16, 54 are rotatably mounted on said body 12. Further, the first wheel 54 is connected to the threaded coupling means 52 for transmitting a rotation to the threaded coupling means 52. When using a cogged transmission belt as driving means, the first wheel 54 preferably is a cogged wheel. Thus, the risk of the belt slipping, when a coupling means 52 is tightened, is minimised. The transmission belt can optionally be provided with a pull handle 28 for easy handling.

The threaded coupling means 52 is rotatably mounted on said body 12 at a portion where said channel emerges from the body 12. The function of the threaded coupling means 52 is to engage with a corresponding, preferably non-rotatable, threaded coupling means 6, shown in FIG. 1, e.g. a coupling means of a valve of a gas cylinder or a coupling means of another system. To engage or disengage with this corresponding coupling means 6, the threaded coupling means 52 has to be rotated a specific number of revolutions. This rotation is accomplished by pulling the belt 14 and thereby creating a rotational movement of the first wheel 54, which in turn rotates the threaded coupling means 52. For engagement, a gripping point of the belt 14 is pulled in one direction V1 and for disengagement it is pulled in the opposite direction V2.

The distance L between the first and the second wheel 54, 16 is at least of such a size that a linear movement of said string shaped driving means 14, corresponding to said distance L, rotates the threaded coupling means 52 as many turns as required for providing a connection. Thus, the distance L between the two wheels is based on the requirement that an operator shall be able to screw the coupling means 52 in to and out of, respectively, the corresponding non-rotatable coupling means, thereby achieving a satisfactory connection or disconnection without having to release the belt. To accomplish this the coupling means 52, in most cases, has to be rotated at least two revolutions. Thus, the distance L has to be at least two times the circumference of the first wheel 54. However, in many cases the coupling means 52 has two be rotated more revolutions, e.g. 4–5 revolutions, for providing the safe connection. Therefore it is often preferred that the distance L is more than five times the circumference of the first wheel 54.

Figure 3:
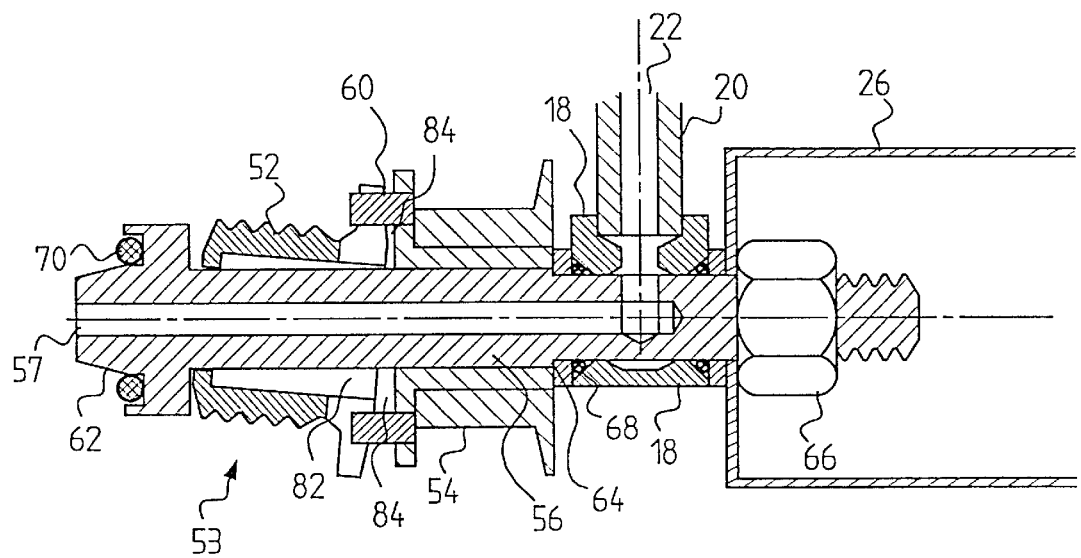
FIG. 3 is a cross-sectional view of a detail of FIG. 2 provided with a male coupling means.
Figure 4:
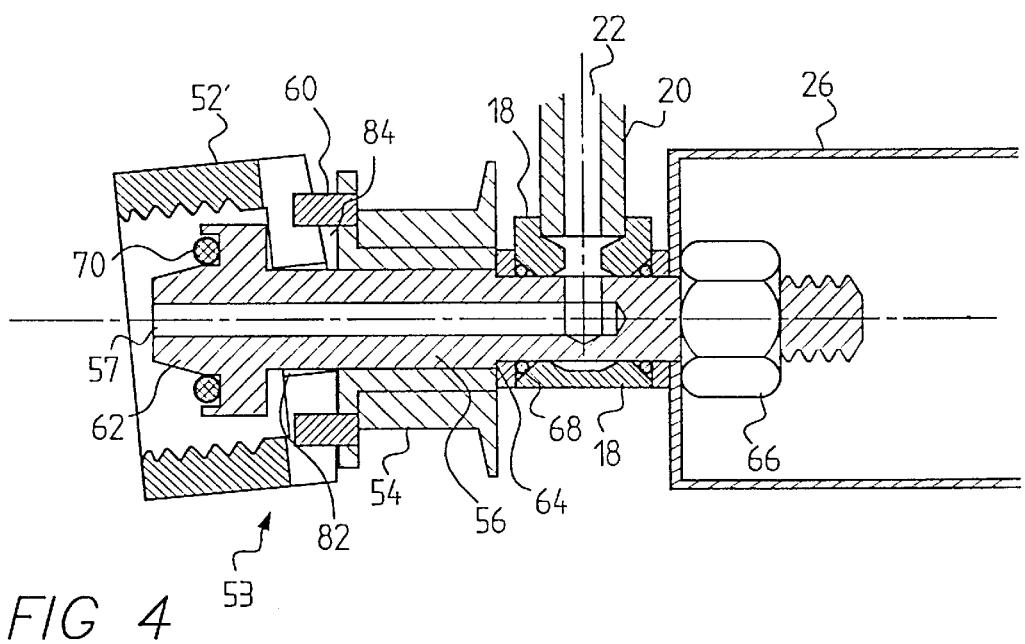
FIG. 4 is a cross-sectional view of a detail of FIG. 2 provided with a female coupling means.

In the preferred embodiment of the invention, the fluid transport channel 22,57, see also FIGS. 3 and 4, extends through the entire body 12 and comprises a feeding channel 22 and a shaft channel 57. The shaft channel 57 communicates with the feeding channel 22 and emerges at the coupling means 52. As shown in FIG. 2 the feeding channel within the body 12 is connected to a fluid transport system via a swivel connection 24. The swivel connection 24 is used for making it easy to turn the connector device 10 in respect of a tube or a pipe of the fluid transport system 2.

In the presently preferred embodiment of the invention, the body 12 comprises a feeding pipe 20, a housing 18, a shaft 56, and a positioning handle 26, see FIGS. 2–4.

The feeding pipe 20 serves as a channel for fluid and as a support for keeping the second wheel 16 at the distance L from the first wheel 54. Thus, it is important that the pipe 20 is made of a material that can uphold this support, e.g. metal. The feeding pipe 20 is connected to the swivel connection 24 and the housing 18, respectively, at different ends of the pipe 20.

The shaft 56, see FIGS. 3–4, provides support and serves as an axle for the first wheel 54 and the threaded coupling means 52. Further, the shaft 56 is in a first end provided with a head portion 62, from which the channel 57 emerges, for transmission of the fluid to or from another fluid system.

The channels 22, 57 of the feeding pipe 20 and the shaft 56, respectively, are connected within the housing 18. The feeding pipe 20 is preferably permanently mounted to the housing 18 while the shaft 56 is positioned through the housing 18 and is fixed by pressing the housing 18 against a shoulder 64 of the shaft by a pressing means 66. For example, this could be achieved by providing threads to the second end of the shaft 56 (the end not comprising the head portion 62) and then generating the required pressure with a pressing means 66 in form of a nut, see FIGS. 2–4 and FIG. 9.

The shaft 56 extends through the housing 18, as mentioned above, to make it easy to dismount and replace. This also makes it possible to dismount the threaded coupling means 52. The connection of the shaft 56 to the housing 18 is sealed by a sealing ring 68, e.g. an O-ring, which is pressed against both the housing 18 and the shaft 56 when the shaft 56 is mounted.

Figure 9:
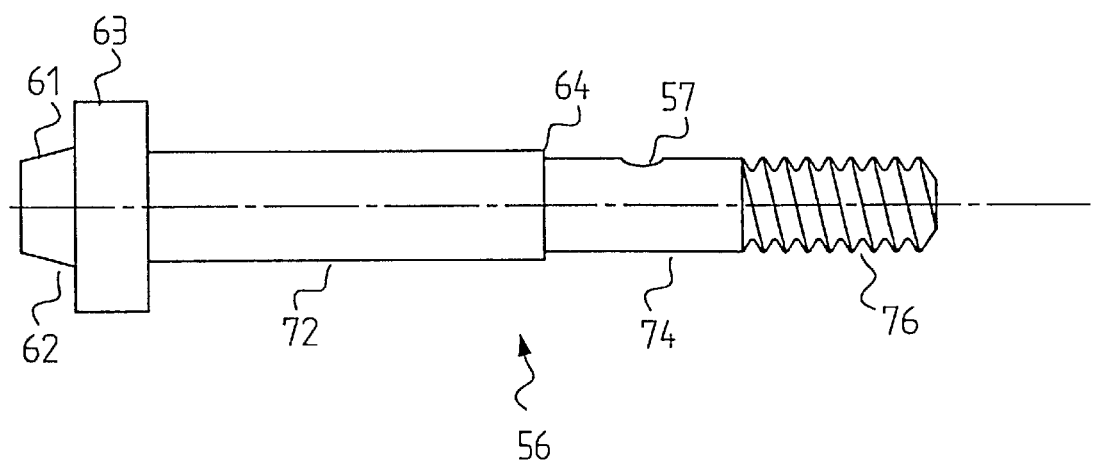
FIG. 9 is a view of the shaft in FIG. 3.

In a preferred embodiment of the invention the shaft is a cylinder having various diameters along its length, see FIG. 9. Starting at the head portion 62 in its first end, the shaft is formed to correspond to the type of coupling means it is designed to be connected to. The head portion 62 comprises a channel portion 61 which is positioned at the end of the shaft 56 where the channel 57 emerges from the shaft 56. Further, the head portion 62 comprises a flange portion 63, which is positioned at a distance from the point where the channel 57 emerges. The flange portion 63 is formed to seal the connection when the head portion 62 is pressed against a corresponding coupling means. To achieve good sealing the flange portion 63 is provided with a sealing ring 70, shown in FIGS. 3 and 4. After the flange portion 63 the diameter is decreased, in respect of the flange portion, at a second portion 72 of the shaft. On this portion of the shaft 56 the threaded coupling means 52 and the first wheel 54 are arranged. After this second portion 72 of the shaft a third portion 74 of even lesser diameter is provided. This third portion 74 has a diameter of a size corresponding to a receiving bore of the housing 18. The third portion 74 is followed by a fourth portion 76, which is of essentially the same diameter as the third portion 74. The fourth portion 76 is threaded and starts at the point where the shaft 56, when mounted to the housing 18, emerges from the housing 18. The shaft 56 is pressed to the housing 18 by a nut 66, screwed on to the threads of the fourth portion 76 of the shaft 18, and by the shoulder 64 between the second and the third portions.

This design makes it easy to replace the shaft 56 by unscrewing the nut 66 and pulling the shaft out of the housing 18. Additionally, it makes it easy to replace the threaded coupling means 52, when the shaft 56 is dismounted from the housing.

In the preferred embodiment of the invention a positioning handle 26 is provided at the end of the shaft 56. The handle is preferably a cylinder that is pressed to the housing by the nut 66, which also presses the shaft 56 to the housing. The positioning handle 26 is used when positioning the threaded coupling means 52 in a position for engagement during operation of the connector device 10.

In general terms, the threaded coupling means 52 is rotatably mounted on said shaft 56 and comprises an engagement surface, a support surface, and a transmission portion. The engagement surface is a threaded cylindrical surface arranged for engagement with a corresponding coupling means. The transmission portion is a portion of the coupling means where the wheel engages with the coupling means for transmitting the rotation. The support surface is a surface of a bore of the coupling means that encloses the shaft and the shaft supports the coupling means via this surface.

The coupling means is arranged to make it easy to screw it into the corresponding coupling means. This is achieved by an alignment means allowing a longitudinal axis of the coupling means 52 to be angled in respect of a longitudinal axis of the shaft 56. The alignment means prevents the threads of the coupling means, respectively, to jam when the connection device is not held in line with the corresponding coupling device during a connecting or disconnecting operation. The jam is generally a result of increasing friction between the engaging threads due to an externally applied force. Thus, the coupling means is able to dynamically adapt its angle in respect of the shaft in an effort to keep the optimal direction in respect of the corresponding coupling means.

Now referring to FIGS. 3, 5 and 6, a preferred embodiment of a male threaded coupling means 52 is shown. The male coupling means comprises a cylindrical portion provided with threads 102a. The inner surface of the cylindrical portion provides the support surface 104a.

The angling of the longitudinal axis of the male coupling means 52 is achieved by providing an alignment means 53 in the form of a radial play 82 between the outer surface of the shaft 56 and the support surface 104a of the coupling means. This radial play 82 is achieved by making the inner diameter of said cylinder, at the portion where the coupling means is arranged, larger than the outer diameter of the shaft.

Further, the alignment means 53 preferably also comprises an axial play 84 for the male coupling means 52 in the direction of the axis of the shaft, between the head portion 62 and the first wheel 54. This axial play 84 is provided to improve the possibility to angle the coupling means 52 and not just move it in a direction perpendicular to the axis of the shaft 56.

To achieve even better angling characteristics, the alignment means 53 preferably also comprises an inwardly radial projection 108 provided at a first end of the male coupling means 52, which is positioned close to the head portion of the shaft 56. The inwardly radial projection 108 makes it possible to provide a greater radial play 82 at the second end of the male coupling means 52 and thereby provide the possibility of a greater angle. The radial projection 108 also keeps the threads 102a at the first end of the coupling means 52 in a position, in respect of the head portion 62, where they easily can engage with the threads of a corresponding coupling means.

At the second end of the coupling means the transmission portion 106 is provided as a transmission disc comprising slots 78 that penetrates the disc. The surface 80 of the transmission portion 106 of the coupling means 52 facing the first wheel, when mounted to the shaft, are conical. The conical surface is so arranged that, when the axis of the coupling means 52 is parallel with the axis of the shaft, the distance between the coupling means 52 and the wheel 54 increases when the radial distance from the axis of the coupling means 52 increases. By forming the surface 80 like this the coupling means 52 can be angled more, in respect of the shaft 56, than with a totally plane surface. Thereby, improved radial play 82 and axial play 84 are achieved.

Now referring to FIGS. 4, 7 and 8, a preferred embodiment of a female threaded coupling means 52' is shown. The female threaded coupling means 52' is basically the same as the male threaded coupling means regarding the essential form and function. Corresponding means have the corresponding reference numerals. However, there are some differences that will be described in the following.

The cylindrical portion of the female threaded coupling means 52' encloses the head portion of the shaft 56 and the threads 102b of the cylindrical portion are applied on the inner surface of said cylindrical portion. Therefore, the supporting surface 104b is provided at a portion of the female coupling means 52' that extends towards the center thereof. Said portion, provided with the supporting surface 104b, is positioned at the end of the female coupling means 52' that is close to the wheel 54 and the portion is also functioning as the transmission portion 106. The female threaded coupling means 52' does not have any radial projection corresponding to the radial projection of the male threaded coupling means. Thus the alignment means 53 of the female coupling means 52' is formed by a radial play 82 between the supporting surface 104b and the shaft 56. Preferably the alignment means 53 also comprises an axial play 84.

The transmission of the rotation from the first wheel 54 to the coupling means 52 is achieved by a gripping means. In an embodiment of the invention this gripping means comprises at least one transmission pin 60, provided for engagement with both the threaded coupling means 52 and the wheel 54 and positioned at a radial distance from the axis of the wheel. In the preferred embodiment of the invention the transmission of the rotation is achieved by two transmission pins 60 fixed to the first wheel 54 and engaging with one slot 78 each of the transmission portion 56 of the coupling means 52. The slot 78 is wider than the transmission pin 60, preferably two times the width of the transmission pin 60, and extends radial, in respect of the coupling device, see FIGS. 6 and 8. This construction results in a good transmission of rotation without great interference of the angling of the coupling means. Preferably, there are arranged two transmission pins 60 at the first wheel 54.

A preferred method for connecting a connector device to a non-rotatable threaded coupling means is now described, with reference to FIGS. 2 and 3.

The head portion 62 of the shaft 56 is positioned at an opening of the non-rotating threaded coupling means for engaging with the non-rotating threaded coupling means when the rotatable threaded coupling means 52 of the connector device 10 is rotated. Then, the string shaped driving means 14 is pulled in the direction V1. The movement of the driving means 14 rotates the wheel 54, which transfers the rotation to the rotatable threaded coupling means 52 of the connector device 10.

The rotation of the rotatable threaded coupling means 52 brings the rotatable threaded coupling means 52 to engage with the non-rotatable threaded coupling means and a safe connection is established.

If the connector device 10 is not in alignment or is moved out of alignment with the non-rotating threaded coupling means 6 during the phase of engaging, the rotatable threaded coupling means 52 is aligning it self to the alignment of the non-rotating threaded coupling means 6. By having the rotatable threaded coupling means 52 aligning to the alignment of the non-rotating threaded coupling means 6 the risk of the threads getting stuck is minimised.

It should be emphasised that the preferred embodiment described herein is in no way limiting and that many alternative embodiments are possible within the scope of protection defined by the appended claims.

For example, the extension of the fluid channel from the coupling means can be provided in alternative ways, such as by a flexible tubing connected to the internal channel at an optional point on the body of the connector device.

What is claimed is:

1. A connector device (10) for providing a connection between a first and a second adaptor in a fluid transport system (2), comprising:
   a body (12),
   a threaded coupling means (52) rotatably arranged at said body (12), a fluid transport channel (22, 57) extending from said coupling means (52) for connection to said first adaptor, wherein
   string shaped driving means (14) for rotating said threaded coupling means (52) provides a connection between said threaded coupling means (52) and said second adaptor.

2. The device according to claim 1, wherein said string shaped driving means (14) is applied to a first wheel (54), which is connected to said threaded coupling means (52), and to a second wheel (16), which is positioned at a distance (L) from said first wheel (54).

3. The device according to claim 2, wherein said distance (L) is of at least twice the circumference of the first wheel (54).

4. The device according to claim 1, wherein the body (12) comprises a shaft (56), and in that the coupling means (52) is rotatably mounted on said shaft (56).

5. The device according to claim 1, wherein there is provided means (53) for alignment of the coupling means (52), with respect to a corresponding coupling means (6).

6. The device according to claim 4, wherein the threaded coupling means (52) is moveably mounted on the shaft (56) to allow angular displacement of said coupling means (52) in relation to said shaft (56).

7. The device according to claim 4, wherein the threaded coupling means (52) is arranged with a radial play (82) in relation to the shaft (56).

8. The device according to claim 4, wherein gripping means (60, 78) provides the transmission of rotation between the first wheel (54) and the coupling means (52) without preventing an angular displacement of the coupling means (52).

9. The device according to claim 4, wherein the threaded coupling means (52) is replaceably mounted on the shaft (56).

* * * * *